United States Patent
Chuang et al.

(10) Patent No.: US 7,254,768 B2
(45) Date of Patent: Aug. 7, 2007

(54) MEMORY COMMAND UNIT THROTTLE AND ERROR RECOVERY

(75) Inventors: Weitong Chuang, Sunnyvale, CA (US); Erik Andersen, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 351 days.

(21) Appl. No.: 11/060,496

(22) Filed: Feb. 18, 2005

(65) Prior Publication Data

US 2006/0190777 A1     Aug. 24, 2006

(51) Int. Cl.
   *G11C 29/00* (2006.01)
(52) U.S. Cl. .................. 714/763; 370/230
(58) Field of Classification Search ........... 370/391, 370/412, 389, 229, 230; 710/260; 714/763
   See application file for complete search history.

(56) References Cited

U.S. PATENT DOCUMENTS

| | | | |
|---|---|---|---|
| 5,414,704 | A | 5/1995 | Spinney |
| 5,423,015 | A | 6/1995 | Chung |
| 5,610,905 | A | 3/1997 | Murthy et al. |
| 5,892,922 | A | 4/1999 | Lorenz |
| 5,991,295 | A | 11/1999 | Tout et al. |
| 6,016,310 | A | 1/2000 | Muller et al. |
| 6,088,356 | A | 7/2000 | Hendel et al. |
| 6,119,196 | A | 9/2000 | Muller et al. |
| 6,259,699 | B1 | 7/2001 | Opalka et al. |
| 6,335,935 | B2 | 1/2002 | Kadambi et al. |
| 6,425,015 | B1 | 7/2002 | Jennings et al. |
| 6,591,299 | B2 | 7/2003 | Riddle et al. |
| 6,707,818 | B1 * | 3/2004 | Kadambi et al. ........... 370/391 |
| 6,975,637 | B1 * | 12/2005 | Lenell ...................... 370/412 |
| 6,981,084 | B2 * | 12/2005 | Connor ...................... 710/260 |
| 6,996,099 | B1 * | 2/2006 | Kadambi et al. ........... 370/389 |
| 7,088,713 | B2 * | 8/2006 | Battle et al. ................ 370/389 |
| 7,145,869 | B1 * | 12/2006 | Kadambi et al. ........... 370/229 |

FOREIGN PATENT DOCUMENTS

| | | |
|---|---|---|
| EP | 0312917 A2 | 4/1989 |
| EP | 0785699 A2 | 7/1997 |
| EP | 1093266 A2 | 4/2001 |
| WO | WO 99/00938 | 1/1999 |
| WO | WO 99/00949 | 1/1999 |
| WO | WO 99/00950 | 1/1999 |

* cited by examiner

*Primary Examiner*—David Ton
(74) *Attorney, Agent, or Firm*—Squire, Sanders & Dempsey L.L.P.

(57) ABSTRACT

A network device for minimizing latency and correcting errors associated with information transmitted from an external memory device. The network device includes a management unit for requesting information stored on at least one external memory device. The network device also includes a command unit for transmitting a request from the management unit to the external memory device. The command unit maintain at least one counter that is associated with current requests and compares the at least one counter to at least one predefined threshold in order to throttle the management unit when the at least one counter exceeds the at least one threshold. The network device further includes means for aligning information from the at least one external memory device with information transmitted from the command unit to the management unit and for ensuring that aligned information is accurate.

25 Claims, 7 Drawing Sheets

MEMORY COMMAND UNIT THROTTLE AND ERROR RECOVERY

BACKGROUND OF THE INVENTION

1. Field of the Invention

The present invention relates to a network device in a packet switched network and more particularly to a method of throttling a memory management unit and of ensuring that information being sent to the memory management unit from an external memory is correct.

2. Description of the Related Art

A packet switched network may include one or more network devices, such as a Ethernet switching chip, each of which includes several modules that are used to process information that is transmitted through the device. Specifically, the device includes an ingress module, a Memory Management Unit (MMU) and an egress module. The ingress module includes switching functionality for determining to which destination port a packet should be directed. The MMU is used for storing packet information and performing resource checks. The egress module is used for performing packet modification and for transmitting the packet to at least one appropriate destination port. One of the ports on the device may be a CPU port that enables the device to send and receive information to and from external switching/routing control entities or CPUs.

As packets enter the device from multiple ports, they are forwarded to the ingress module where switching and other processing are performed on the packets. Thereafter, the packets are transmitted to one or more destination ports through the MMU and the egress module. The MMU enables sharing of packet buffer among different ports while providing resource guarantees for every ingress port, egress port and class of service queue. According to a current switching system architecture, as packets are stored by the MMU the packets may be dynamically stored in one or more memory locations on external memory devices. To retrieve information from the external memory device, the MMU sends a command to the MCU which translates the command into instructions that can be processed by the external memory device. According to a current device, the MMU may request access from up to 16 banks of the external memory device. Multiple simultaneous large requests, however, cause latency problems in the network device. Therefore, a system and method is needed to minimize latency issues.

SUMMARY OF THE INVENTION

According to one aspect of the invention, there is provided a network device for minimizing latency and correcting errors associated with information transmitted from an external memory device. The network device includes a management unit for requesting information stored on at least one external memory device. The network device also includes a command unit for transmitting a request from the management unit to the external memory device. The command unit maintain at least one counter that is associated with current requests and compares the at least one counter to at least one predefined threshold in order to throttle the management unit when the at least one counter exceeds the at least one threshold. The network device further includes means for aligning information from the at least one external memory device with information transmitted from the command unit to the management unit and for ensuring that aligned information is accurate.

According to another aspect of the invention, there is provided a method for minimizing latency and correcting errors associated with information transmitted from an external memory device. The method includes the steps of requesting information stored on at least one external memory device and transmitting a request to the external memory device. The method also includes the step of maintaining at least one counter that is associated with current requests and comparing the at least one counter to at least one predefined threshold in order to throttle a management unit when the at least one counter exceeds the at least one threshold. The method further includes the step of aligning information from the at least one external memory device with information transmitted the management unit and for ensuring that aligned information is accurate.

According to another aspect of the invention, there is provided an apparatus for minimizing latency and correcting errors associated with information transmitted from an external memory device. The apparatus includes requesting means for requesting information stored on at least one external memory device and transmitting means for transmitting a request to the external memory device. The apparatus also includes maintaining means for maintaining at least one counter that is associated with current requests and comparing the at least one counter to at least one predefined threshold in order to throttle a management unit when the at least one counter exceeds the at least one threshold. The apparatus further includes aligning means for aligning information from the at least one external memory device with information transmitted the management unit and for ensuring that aligned information is accurate.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings.

Figure 1:
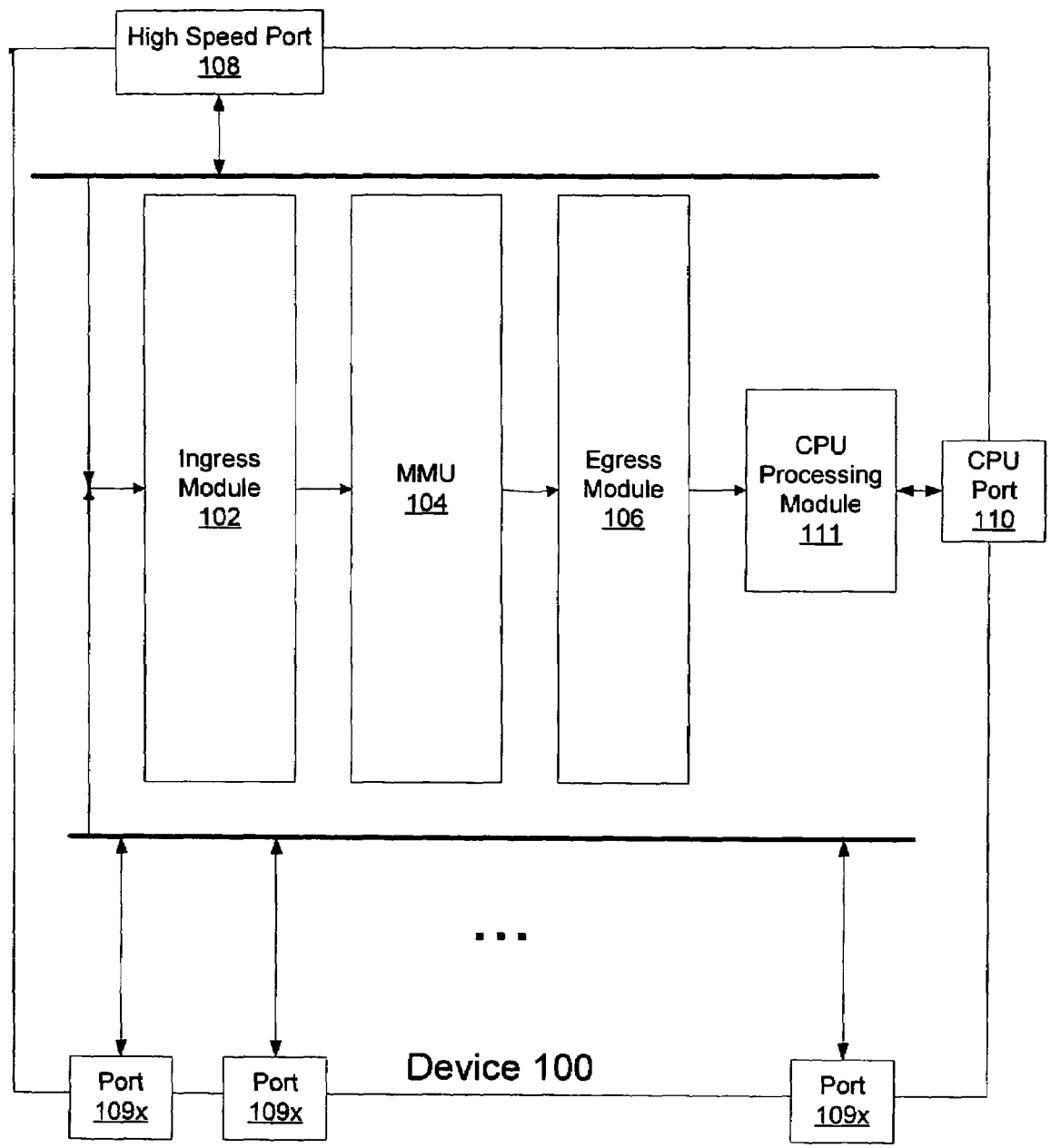
FIG. 1 illustrates a network device in which an embodiment of the present invention may be implemented.

FIG. 1 illustrates a network device, such as a switching chip, in which an embodiment the present invention may be implemented. Device 100 includes an ingress module 102, a MMU 104, and an egress module 106. Ingress module 102 is used for performing switching functionality on an incoming packet. The primary function of MMU 104 is to efficiently manage cell buffering and packet pointer resources in a predictable manner even under severe congestion scenarios. Egress module 106 is used for performing packet modification and transmitting the packet to an appropriate destination port.

Device 100 may also include one internal fabric high speed port, for example a HiGig port, 108, one or more external Ethernet ports 109a-109x, and a CPU port 110. High speed port 108 is used to interconnect various network devices in a system and thus form an internal switching fabric for transporting packets between external source ports and one or more external destination ports. As such, high speed port 108 is not externally visible outside of a system that includes multiple interconnected network devices. CPU port 110 is used to send and receive packets to and from external switching/routing control entities or CPUs. According to an embodiment of the invention, CPU port 110 may be considered as one of external Ethernet ports 109a-109x. Device 100 interfaces with external/off-chip CPUs through a CPU processing module 111, such as a CMIC, which interfaces with a PCI bus that connects device 100 to an external CPU.

Network traffic enters and exits device 100 through external Ethernet ports 109a-109x. Specifically, traffic in device 100 is routed from an external Ethernet source port to one or more unique destination Ethernet ports. In one embodiment of the invention, device 100 supports twelve physical Ethernet ports 109, each of which can operate in 10/100/1000 Mbps speed and one high speed port 108 which operates in either 10 Gbps or 12 Gbps speed.

Figure 2A:
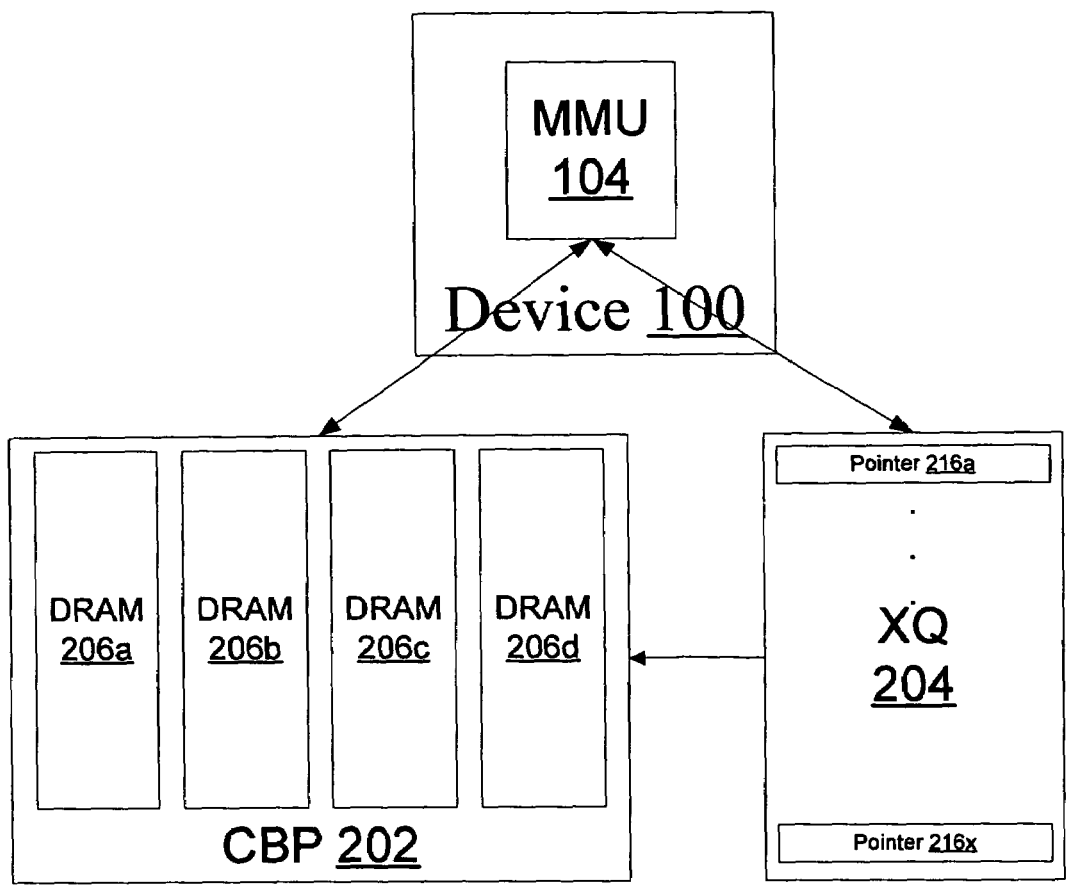
FIG. 2a illustrates the shared memory architecture of the present invention.
Figure 2B:
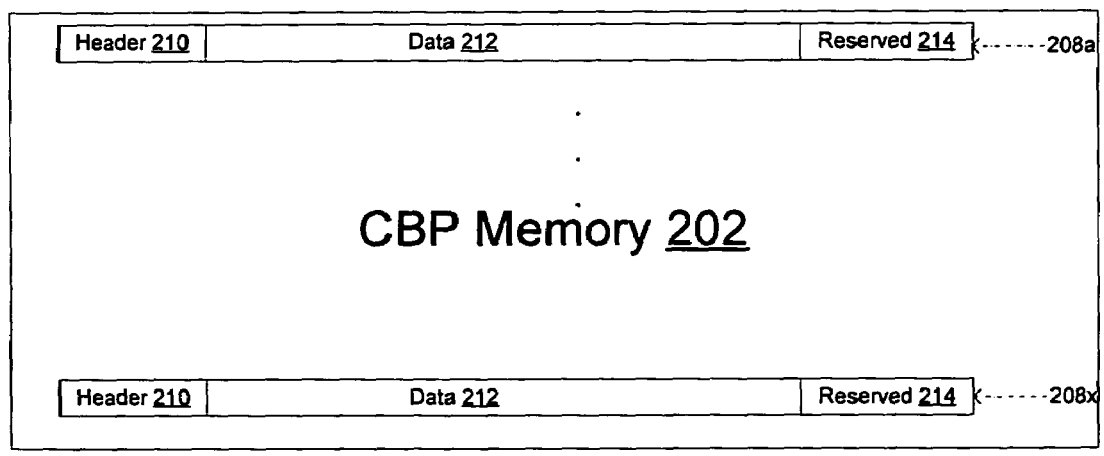
FIG. 2b illustrates the Cell Buffer Pool of the shared memory architecture.

In an embodiment of the invention, device 100 is built around a shared memory architecture, as shown in FIGS. 2a-2d, wherein MMU 104 enables sharing of a packet buffer among different ports while providing for resource guarantees for every ingress port, egress port and class of service queue associated with each egress port. FIG. 2a illustrates the shared memory architecture of the present invention. Specifically, the memory resources of device 100 include a Cell Buffer Pool (CBP) memory 202 and a Transaction Queue (XQ) memory 204. CBP memory 202 is an off-chip resource that is made of 4 DRAM chips 206a-206d. According to an embodiment of the invention, each DRAM chip has a capacity of 288 Mbits, wherein the total capacity of CBP memory 202 is 122 Mbytes of raw storage. As shown in FIG. 2b, CBP memory 202 is divided into 256K 576-byte cells 208a-208x, each of which includes a 32 byte buffer 210, up to 512 bytes for packet data 212 and 32 bytes of reserved space 214. As such, each incoming packet consumes at least one full 576 byte cell 208. Therefore in an example where an incoming includes a 64 byte frame, the incoming packet will have 576 bytes reserved for it even though only 64 bytes of the 576 bytes is used by the frame.

Returning to FIG. 2a, XQ memory 204 includes a list of packet pointers 216a-216x into CBP memory 202, wherein different XQ pointers 216 may be associated with each port. A cell count of CBP memory 202 and a packet count of XQ memory 204 is tracked on an ingress port, egress port and class of service basis. As such, device 100 can provide source guarantees on a cell and/or packet basis.

Figure 2C:
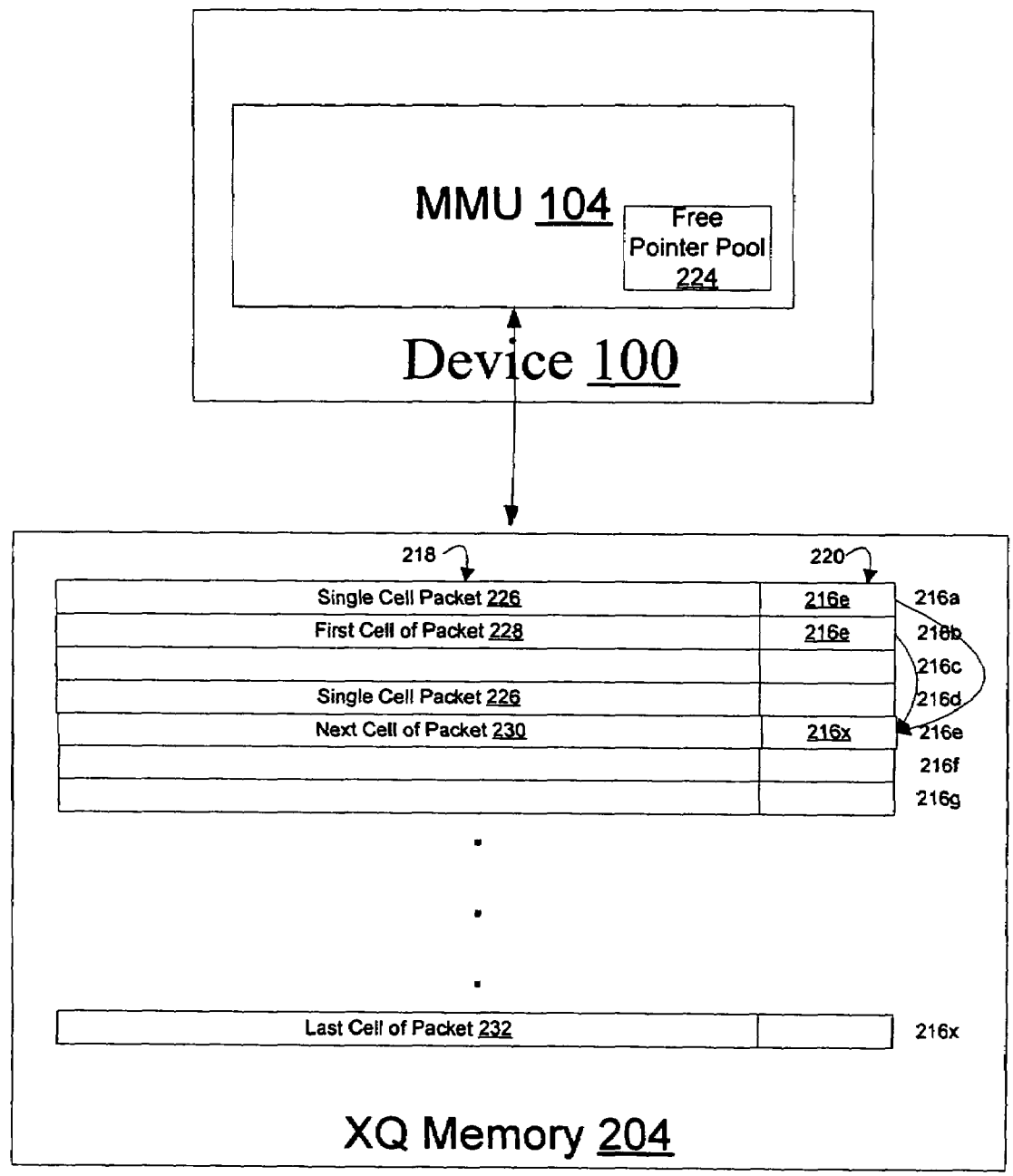
FIG. 2c illustrates the Transaction Queue of the shared memory architecture.

MMU 104 enables dynamic allocation of some memory locations, for example the XQ memory 204 for each packet, wherein packets may be divided into one or more cells. As illustrated in FIG. 2c, MMU 104 includes a free pointer pool 224 with pointers to free locations memory, wherein all pointers that are not assigned to packets are stored in free pointer pool 224. As packets are stored in XQ memory 204, each packet may be stored in one or more of locations 216a-216x, wherein each location includes a cell value 218 and a pointer to the next cell 220. The cell value 218 may indicate that the packet is a single cell packet 226, a first cell of a packet 228, a next cell of a packet 230 or a last cell of a packet 232. Due to processing errors, for example software errors, it is possible for one or more locations 216a-216x to include the same value in next cell field 220, thereby corrupting the cell value 218 in the location pointed to by the duplicate next cell fields 220. For example, as shown in FIG. 2c, the next cell field 220 in locations 216a and 216c point to location 216e and thereby corrupt the cell value of 216e. According to an embodiment of the invention, once MMU 104 retrieves cell value 218 from a location 216, the next cell 220 from the retrieved location is returned to free pointer pool 224. To prevent duplicate pointers from being stored in free pointer pool 224 and thereby continue the corruption of the memory location pointed to by the duplicate pointers, upon reading a packet pointer 216, MMU 104 determines if the pointer to the next cell 220 is appropriate based on the cell value 218. For example, as shown in FIG. 2c, since cell value 218a indicates that the packet is a single cell packet, pointer to the next cell 220 in location 216a should not point to another entry of buffer 204. Since it does, MMU 104 will determine that the pointer to the next cell 220 in location 216a is invalid. MMU 104 thereafter checks to see if another location includes pointer to the next cell 220e and determines that both locations 216a and 216b include invalid cell values 218 and/or invalid next cell pointers 220e. As such, MMU 104 drops the packet information in locations 216a and 216b and upon clearing those memory locations, MMU 104 will not store the cell pointer 220e in free pointer pool 224, thereby enabling MMU 104 to correct any further corruption to free pointer pool 224 and the associated memory locations.

Figure 2D:
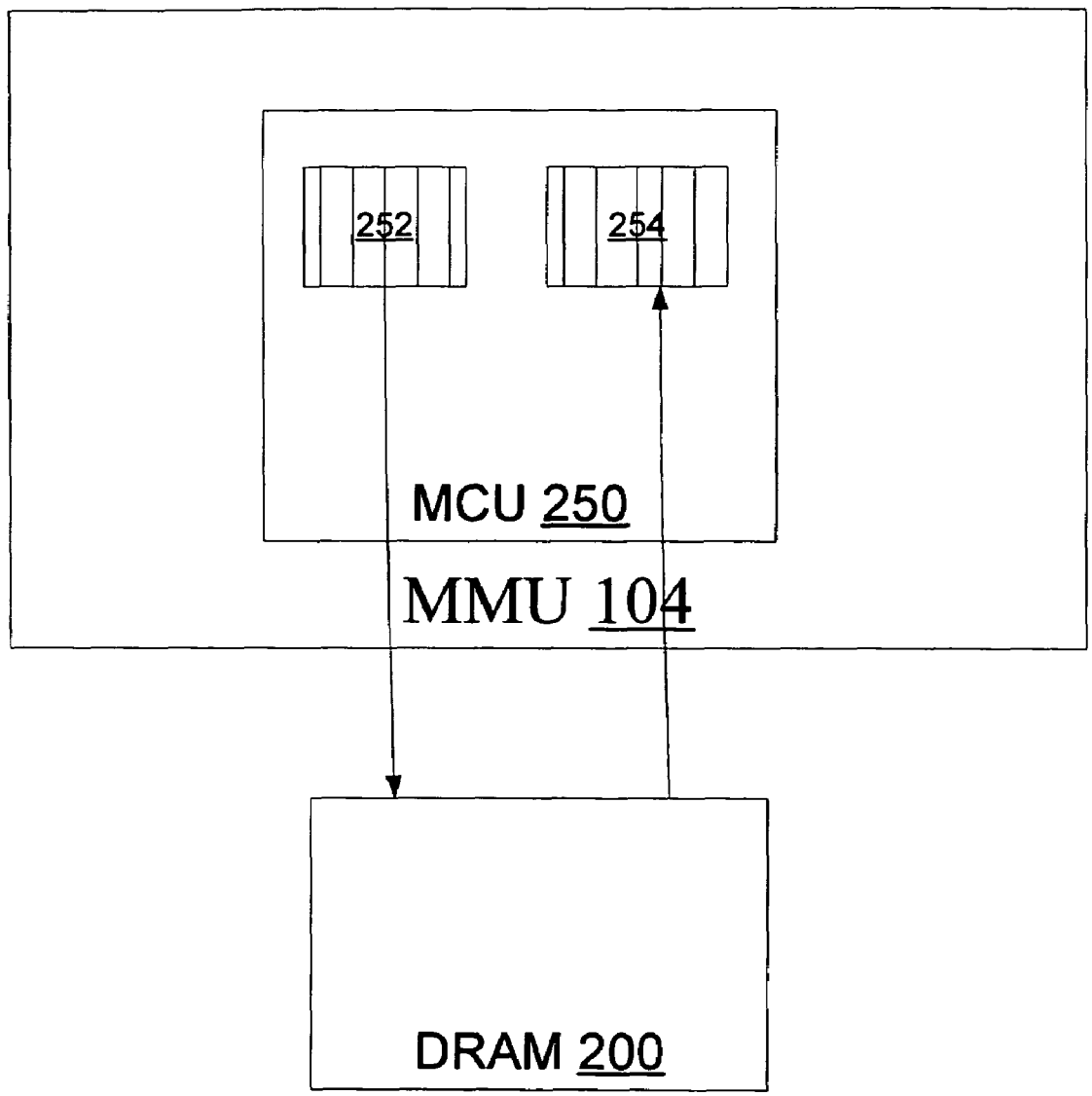
FIG. 2d illustrates how the MMU accesses data in an external memory.

FIG. 2d illustrates how the MMU accesses data in an external memory. MMU 104 also includes a memory controller unit (MCU) 250 which processes command from MMU 104 in order to fetch data from an external DRAM 200, for example CBP 202 or XQ memory 204. According to an embodiment of the invention, MCU 250 includes a command FIFO 252 for storing commands from MMU 104 and a read FIFO 254 for storing information retrieved from DRAM 200. MCU 250 may retrieve 36 bytes of data at a time from DRAM 200 and transmits 32 bytes of data at a time to MMU 104. MCU 250 receives instructional commands from MMU 104, wherein the command instructs MCU 250 from which address in external DRAM 200 to fetch data and how many bytes of data to fetch from the identified address. MCU 250 then translates the MMU command into a lower level instruction for the DRAM memory. Each command includes a request to access a certain number of banks in DRAM 200. With each command, the MCU 250 may read or write up to 544 bytes or 16 banks with a latency of about 108 ns. Each MMU command may therefore include a request for 16 banks which will increase latency in device 100. To minimize the latency issue, when MMU 104 issues a command, MCU 250 counts the number of banks in the MMU command and maintains a counter of the number of banks being accessed by MCU 250. As such, when MCU 250 receives a new command, it adds the number of banks in the command to the bank count and when MCU 250 transmits data to MMU 104, it subtracts from the bank count. Upon receiving a command, MCU 250 compares the bank count with a predefined bank threshold. Furthermore, to account of overhead operations associated with accessing each bank, MCU 250 also compares the number of commands in command FIFO 252 to a predefined command threshold. If either the bank count or command count exceeds the bank threshold or the command threshold, MCU 250 sends a throttle to MMU 104 for MMU to delay transmitting request to MCU 250 or else MCU 250 processes the command.

When MMU 104 issues a command to MCU 250, the request includes the number of banks that should be accessed by MCU 250. As noted above, MCU 250 retrieves up to 36 bytes from DRAM 200 and transmits 32 bytes to MMU 104. Therefore, when MCU 250 issues a request to DRAM 200, DRAM 200 transmits 36 bytes at a time to MCU 250 which transmits 32 bytes at a time to MMU 104. To align information from DRAM 200 with the information transmitted to MMU 104 and to determine how many trunks of data to transmit to MMU 104, MCU 250 multiples the number of banks in the command request with the 36 bytes size from DRAM 200. MCU 250 then divides the product by the 32 byte transmission size from MCU 250 to MMU 104 to determine the number of trunks that will be transmitted to MMU 104. To ensure that the data from DRAM 200 matches the data that MMU is expecting, DRAM 200 then divides the product of the number of banks and the 32 bytes by the number of trunks that may be sent to MMU 104. For example, if MMU 104 issues a command to access 10 banks, MCU 250 expects to receive 360 bytes, i.e., 10 banks multiplied by 36 bytes from the DRAM 200. To align the data received from DRAM 200 with the data transmitted by MCU 250, MCU 250 divides the total data from DRAM 200 by 32. Therefore, MCU 250 determines that 12 trunks of data will be sent to MMU 104. DRAM 200 then divides the 360 bytes by the 12 trunks to verify that the data being sent matches the data that MMU 104 is expecting to receive. If the data sizes do not match, MCU 250 creates an artificial cell with the correct number of trunks expected by MMU 104 and transmits the artificial cell to MMU 104.

Figure 3:
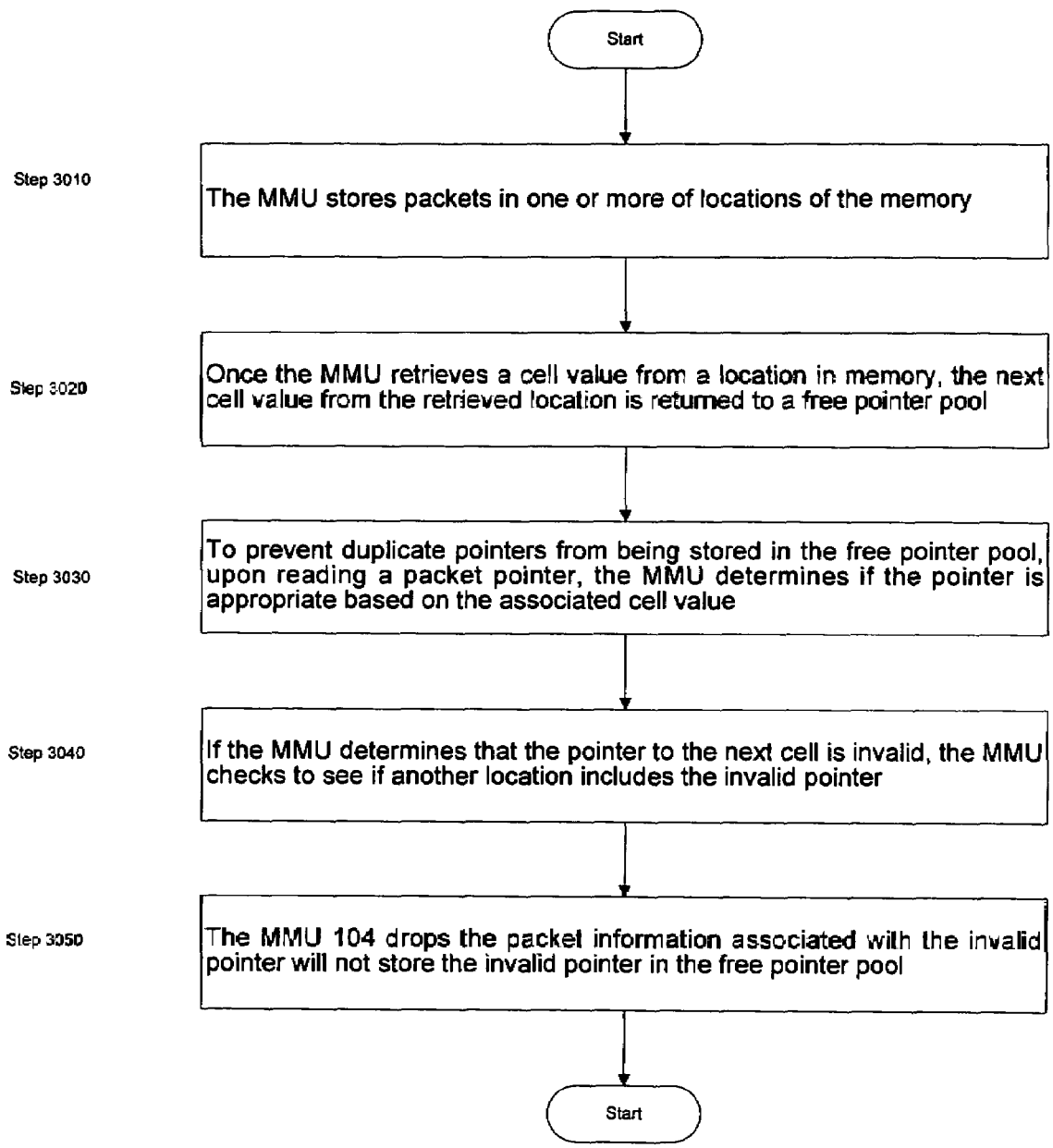
FIG. 3 illustrates the steps implemented by the MMU to correct corrupted memory locations.

FIG. 3 illustrates the steps implemented by the MMU to correct corrupted memory locations. In Step 3010, MMU 104 stores packets in XQ memory 204 in one or more of locations 216a-216x. In Step 3020, once MMU 104 retrieves cell value 218 from a location 216, the next cell 220 from the retrieved location is returned to free pointer pool 224. In Step 3030, to prevent duplicate pointers from being stored in free pointer pool 224 and thereby continue the corruption of the memory location pointed to by the duplicate pointers, upon reading a packet pointer 216, MMU 104 determines if the associated pointer to the next cell 220 is appropriate based on the associated cell value 218. In Step 3040, if MMU 104 determines that the pointer to the next cell 220 in location 216a is invalid, MMU 104 checks to see if another location includes the invalid pointer to the next cell 220e and determines that both locations 216a and 216b include invalid cell values 218 and/or invalid next cell pointers 220e. In Step 3050, MMU 104 drops the packet information in locations 216a and 216b and upon clearing those memory locations, MMU 104 will not store the invalid cell pointer 220e in free pointer pool 224, thereby enabling MMU 104 to correct any further corruption to free pointer pool 224 and the associated memory locations.

Figure 4:
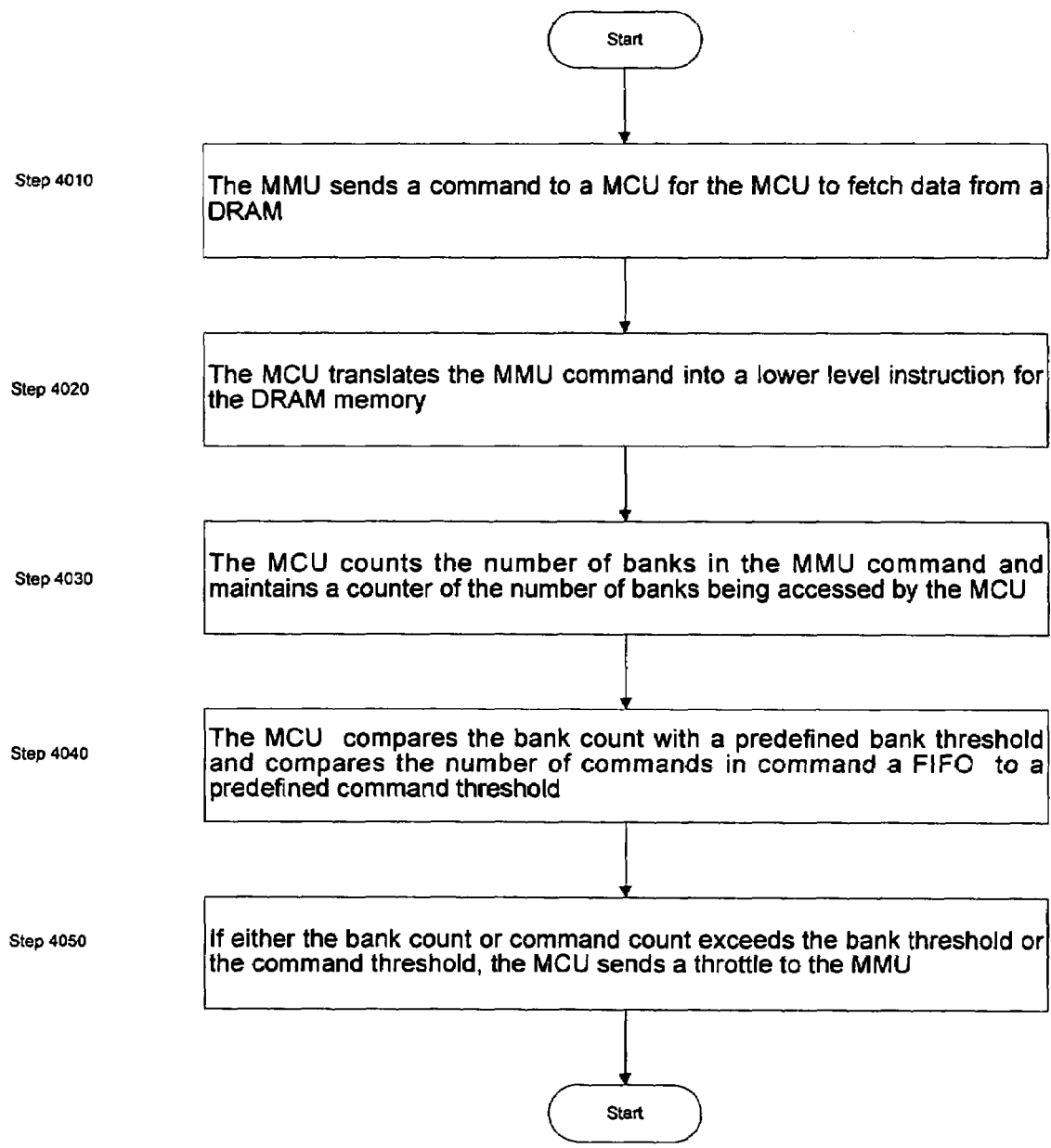
FIG. 4 illustrates the steps implemented to throttle the MMU by the MCU.

FIG. 4 illustrates the steps implemented to throttle the MMU by the MCU. In Step 4010, MMU 104 sends a command to MCU 250 for MCU 250 to fetch data from DRAM 200. In Step 4020, MCU 250 translates the MMU command into a lower level instruction for the DRAM memory. In Step 4030, when MMU 104 issues a command, MCU 250 counts the number of banks in the MMU command and maintains a counter of the number of banks being accessed by MCU 250. In Step 4040, upon receiving a command, MCU 250 compares the bank count with a predefined bank threshold and compares the number of commands in command FIFO 252 to a predefined command threshold. In Step 4050, if either the bank count or command count exceeds the bank threshold or the command threshold, MCU 250 sends a throttle to MMU 104 for MMU to delay transmitting request to MCU 250 or else MCU 250 processes the command.

Figure 5:
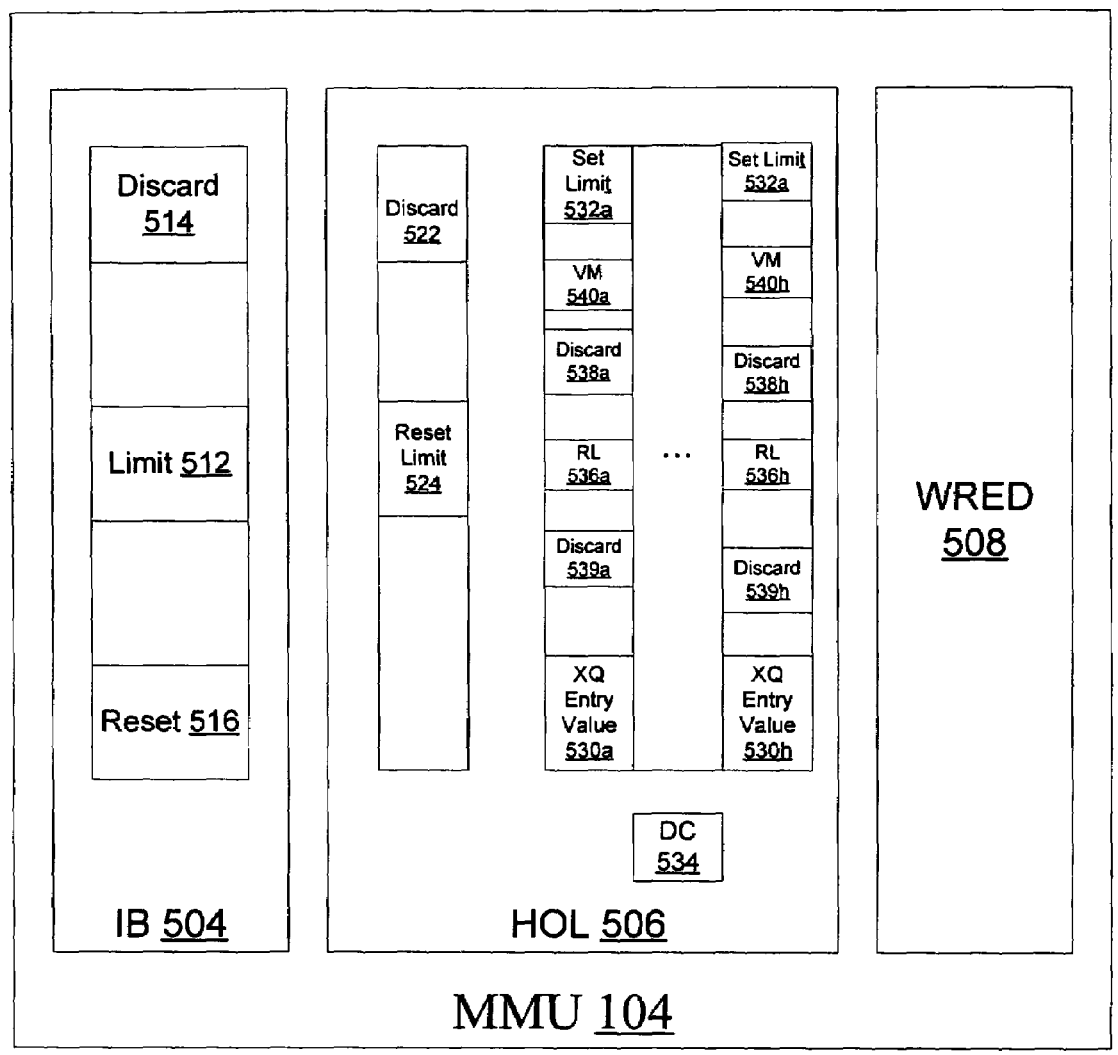
FIG. 5 illustrates buffer management mechanisms that are used by the MMU to impose resource allocation limitations and thereby ensure fair access to resources.

Once a packet enters device 100 on a source port 109, the packet is transmitted to ingress module 102 for processing. During processing, packets on each of the ingress and egress ports share system resources 202 and 204. FIG. 5 illustrates buffer management mechanisms that are used by MMU 104 to impose resource allocation limitations and thereby ensure fair access to resources. MMU 104 includes an ingress backpressure mechanism 504, a head of line mechanism 506 and a weighted random early detection mechanism 508. Ingress backpressure mechanism 504 supports lossless behaviour and manages buffer resources fairly across ingress ports. Head of line mechanism 506 supports access to buffering resources while optimizing throughput in the system. Weighted random early detection mechanism 508 improves overall network throughput.

Ingress backpressure mechanism 504 uses packet or cell counters to track the number of packets or cells used on an ingress port basis. Ingress backpressure mechanism 504 includes registers for a set of 8 individually configurable thresholds and registers used to specify which of the 8 thresholds are to be used for every ingress port in the system. The set of thresholds include a limit threshold 512, a discard limit threshold 514 and a reset limit threshold 516. If a counter associated with the ingress port packet/cell usage rises above discard limit threshold 514, packets at the ingress port will be dropped. Based on the counters for tracking the number of cells/packets, a pause flow control is used to stop traffic from arriving on an ingress port that have used more than its fair share of buffering resources, thereby stopping traffic from an offending ingress port and relieving congestion caused by the offending ingress port. Specifically, each ingress port keeps track of whether or not it is in an ingress backpressure state based on ingress backpressure counters relative to the set of thresholds. When the ingress port is in ingress backpressure state, pause flow control frames with a timer value of (0×FFFF) are periodically sent out of that ingress port. When the ingress port is no longer in the ingress backpressure state, the pause flow control frame with a timer value of 0×00 is sent out of the ingress port and traffic is allowed to flow again. If an ingress port is not currently in an ingress backpressure state and the packet counter rises above limit threshold 512, the status for the ingress port transitions into the ingress backpressure state. If the ingress port is in the ingress backpressure state and the packet counter falls below reset limit threshold 516, the status for the port will transition out of the backpressure state.

Head of line mechanism 506 is provided to support fair access to buffering resources while optimizing throughput in the system. Head of line mechanism 506 relies on packet dropping to manage buffering resources and improve the overall system throughput. According to an embodiment of the invention, head of line mechanism 506 uses egress counters and predefined thresholds to track buffer usage on egress port and class of service basis and thereafter makes decisions to drop any newly arriving packets on the ingress ports destined to a particular oversubscribed egress port/ class of service queue. Head of line mechanism 506 supports different thresholds depending on the color of the newly arriving packet. Packets may be colored based on metering and marking operations that take place in the ingress module and the MMU acts on these packets differently depending on the color of the packet.

According to an embodiment of the invention, head of line mechanism 506 is configurable and operates independently on every class of service queue and across all ports, including the CPU port. Head of line mechanism 506 uses counters that track XQ memory 204 and CBP memory 202 usage and thresholds that are designed to support a static allocation of CBP memory buffers 202 and dynamic allocation of the available XQ memory buffer 204. A discard threshold 522 is defined for all cells in CBP memory 202, regardless of color marking. When the cell counter associated with a port reaches discard threshold 522, the port is transition to a head of line status. Thereafter, the port may transition out of the head of line status if its cell counter falls below a reset limit threshold 524.

For the XQ memory 204, a guaranteed fixed allocation of XQ buffers for each class of service queue is defined by a XQ entry value 530a-530h. Each of XQ entry value 530a-530h defines how many buffer entries should be reserved for an associated queue. For example, if 100 bytes of XQ memory are assigned to a port, the first four class of service queues associated with XQ entries 530a-530d respectively may be assigned the value of 10 bytes and the last four queues associated with XQ entries 530d-530h respectively may be assigned the value of 5 bytes. According to an embodiment of the invention, even if a queue does not use up all of the buffer entries reserved for it according to the associated XQ entry value, head of line mechanism 506 may not assign the unused buffer to another queue. Nevertheless, the remaining unassigned 40 bytes of XQ buffers for the port may be shared among all of the class of service queues associated with the port. Limits on how much of the shared pool of the XQ buffer may be consumed by a particular class of service queue is set with a XQ set limit threshold 532. As such, set limit threshold 532 may be used to define the maximum number of buffers that can be used by one queue and to prevent one queue from using all of the available XQ buffers. To ensure that the sum of XQ entry values 530a-530h do not add up to more than the total number of available XQ buffers for the port and to ensure that each class of service queue has access to its quota of XQ buffers as assigned by its entry value 530, the available pool of XQ buffer for each port is tracked using a port dynamic count register 534, wherein dynamic count register 534 keeps track of the number of available shared XQ buffers for the port. The initial value of dynamic count register 534 is the total number of XQ buffers associated with the port minus a sum of the number of XQ entry values 320a-320h. Dynamic count register 534 is decremented when a class of service queue uses an available XQ buffer after the class of service queue has exceeded its quota as assigned by its XQ entry value 530. Conversely, dynamic count register 534 is incremented when a class of service queue releases a XQ buffer after the class of service queue has exceeded its quota as assigned by its XQ entry value 530.

When a queue requests XQ buffer 204, head of line mechanism 506 determines if all entries used by the queue is less than the XQ entry value 530 for the queue and grants the buffer request if the used entries are less then the XQ entry value 530. If however, the used entries are greater than the XQ entry value 530 for the queue, head of line mechanism 506 determines if the amount requested is less than the total available buffer or less then the maximum amount set for the queue by the associated set limit threshold 532. Set limit threshold 532 is in essence a discard threshold that is associated with the queue, regardless of the color marking of the packet. As such, when the packet count associated with the packet reaches set limit threshold 532, the queue/port enters into a head of line status. When head of line mechanism 506 detects a head of line condition, it sends an update status so that ingress module 102 can drop packets on the congested port. However, due to latency, there may be packets in transition between ingress module 102 and MMU 104 when the status update is sent by head of line mechanism 506. In this case, the packet drops may occur at MMU 104 due to the head of line status. In an embodiment of the invention, due to the pipeline of packets between ingress module 102 and MMU 104, the dynamic pool of XQ pointers is reduced by a predefined amount. As such, when the number of available XQ pointers is equal to or less than the predefined amount, the port is transition to the head of line status and an update status is sent to by MMU 104 to ingress module 102, thereby reducing the number of packets that may be dropped by MMU 104. To transition out of the head of line status, the XQ packet count for the queue must fall below a reset limit threshold 536.

It possible for the XQ counter for a particular class of service queue to not reach set limit threshold 532 and still have its packet dropped if the XQ resources for the port are oversubscribed by the other class of service queues. In an embodiment of the invention, intermediate discard thresholds 538 and 539 may also be defined for packets containing specific color markings, wherein each intermediate discard threshold defines when packets of a particular color should be dropped. For example, intermediate discard threshold 538 may be used to define when packets that are colored yellow should be dropped and intermediate discard threshold 539 may be used to define when packets that are colored red should be dropped. According to an embodiment of the invention, packets may be colored one of green, yellow or red depending on the priority level assigned to the packet. To ensure that packets associated with each color are processed in proportion to the color assignment in each queue, one embodiment of the present invention includes a virtual maximum threshold 540. Virtual maximum threshold 540 is equal to the number of unassigned and available buffers divided by the sum of the number of queues and the number of currently used buffers. Virtual maximum threshold 540 ensures that the packets associated with each color are processed in a relative proportion. Therefore, if the number of available unassigned buffers is less than the set limit threshold 532 for a particular queue and the queue requests access to all of the available unassigned buffers, head of line mechanism 506 calculates the virtual maximum threshold 540 for the queue and processes a proportional amount of packets associated with each color relative to the defined ratios for each color.

To conserve register space, the XQ thresholds may be expressed in a compressed form, wherein each unit represents a group of XQ entries. The group size is dependent upon the number of XQ buffers that are associated with a particular egress port/class of service queue.

Weighted random early detection mechanism 508 is a queue management mechanism that pre-emptively drops packets based on a probabilistic algorithm before XQ buffers 204 are exhausted. Weighted random early detection mechanism 508 is therefore used to optimize the overall network throughput. Weighted random early detection mechanism 508 includes an averaging statistic that is used to track each queue length and drop packets based on a drop profile defined for the queue. The drop profile defines a drop probability given a specific average queue size. According to an embodiment of the invention, weighted random early detection mechanism 508 may defined separate profiles on based on a class of service queue and packet.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A network device for minimizing latency and correcting errors associated with information transmitted from an external memory device, the network device comprising:
   a management unit for requesting information stored on at least one external memory device;
   a command unit for transmitting a request from the management unit to the external memory device, wherein the command unit maintain at least one counter that is associated with current requests and compares the at least one counter to at least one predefined threshold in order to throttle the management unit when the at least one counter exceeds the at least one threshold; and
   aligning means for aligning information from the at least one external memory device with information transmitted from the command unit to the management unit and for ensuring that aligned information is accurate.

2. The network device according to claim 1, wherein the management unit is configured to send a command to the command unit which is configured to fetch data from the at least one external memory device.

3. The network device according to claim 1, wherein the command unit comprises a command buffer for storing commands from the management unit and a read buffer for storing data from the at least one external device.

4. The network device according to claim 3, wherein the command unit is configured to retrieve 36 bytes of data from the at least one external device and to transmit 32 bytes of data to the management unit.

5. The network device according to claim 1, wherein the management unit is configured to send a command to the command unit, the command being used to instruct the command unit from which address in the external device to fetch data and how many bytes of data to fetch from the address.

6. The network device according to claim 1, wherein the command unit is configured to translate a command from the management unit to a lower level instruction for the external device.

7. The network device according to claim 1, wherein the management unit is configured to send a command to the command unit, the command including a request to access a number of banks.

8. The network device according to claim 1, wherein the command unit is configured to maintain a bank count and a command count based on a command from the management unit and to compare the bank count with a bank threshold and the command count with a command threshold.

9. The network device according to claim 1, wherein the management unit is configured to delay transmitting commands to the command unit upon receiving a throttle from the command unit.

10. The network device according to claim 1, wherein the command unit is configured to calculate a number of trunks to be transmitted to the management unit.

11. The network device according to claim 1, wherein the network device verifies that the data being sent to the management unit is the data that is expected by the management unit, wherein if the data being sent to the management unit is not equal to the data expected by the management unit, the command unit is configured to create an artificial packet that matches the data expected by the management unit.

12. The network device according to claim 11, wherein the management unit is configured drop the artificial packet.

13. A method for minimizing latency and correcting errors associated with information transmitted from an external memory device, the method comprising the steps of:
   requesting information stored on at least one external memory device;
   transmitting a request to the external memory device;
   maintaining at least one counter that is associated with current requests and comparing the at least one counter to at least one predefined threshold in order to throttle a management unit when the at least one counter exceeds the at least one threshold; and
   aligning information from the at least one external memory device with information transmitted the management unit and for ensuring that aligned information is accurate.

14. The method according to claim 13, further comprising sending a command to a command unit which is configured to fetch data from the at least one external memory device.

15. The method according to claim 13, further comprising storing commands from the management unit and data from the at least one external device in a command unit.

16. The method according to claim 13, further comprising retrieving 36 bytes of data from the at least one external device and transmitting 32 bytes of data to the management unit.

17. The method according to claim 13, further comprising instructing a command unit from which address in the at least one external device to fetch data and how many bytes of data to fetch from the address.

18. The method according to claim 13, further comprising translating a command from the management unit to a lower level instruction for the external device.

19. The method according to claim 13, further comprising including a request to access a number of banks in a command.

20. The method according to claim 13, further comprising maintaining a bank count and a command count based on a command from the management unit and comparing the bank count with a bank threshold and the command count with a command threshold.

21. The method according to claim 13, further comprising delaying transmission of commands to a command unit upon receiving a throttle by the management unit.

22. The method according to claim 13, further comprising calculating a number of trunks to be transmitted to the management unit.

23. The method according to claim 13, further comprising that the data being sent to the management unit is the data that is expected by the management unit, wherein if the data being sent to the management unit is not equal to the data expected by the management unit, creating an artificial packet that matches the data expected by the management unit.

24. The method according to claim 13, further comprising dropping an artificial packet by the management unit.

25. An apparatus for minimizing latency and correcting errors associated with information transmitted from an external memory device, the apparatus comprising:

requesting means for requesting information stored on at least one external memory device;

transmitting means for transmitting a request to the external memory device;

maintaining means for maintaining at least one counter that is associated with current requests and comparing the at least one counter to at least one predefined threshold in order to throttle a management unit when the at least one counter exceeds the at least one threshold; and aligning means for aligning information from the at least one external memory device with information transmitted the management unit and for ensuring that aligned information is accurate.

* * * * *